Dec. 15, 1931.   H. J. NESS ET AL   1,836,273
METHOD OF MAKING BALL BEARING CAGES
Filed Dec. 11, 1928    3 Sheets-Sheet 1
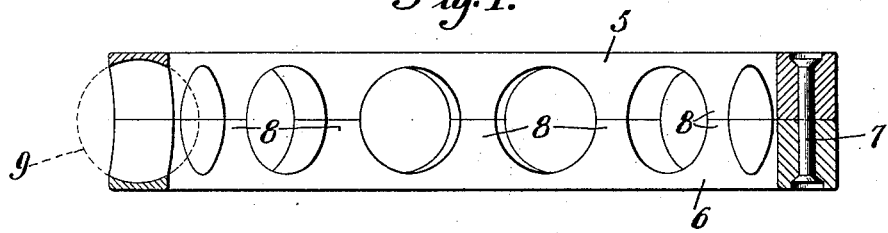
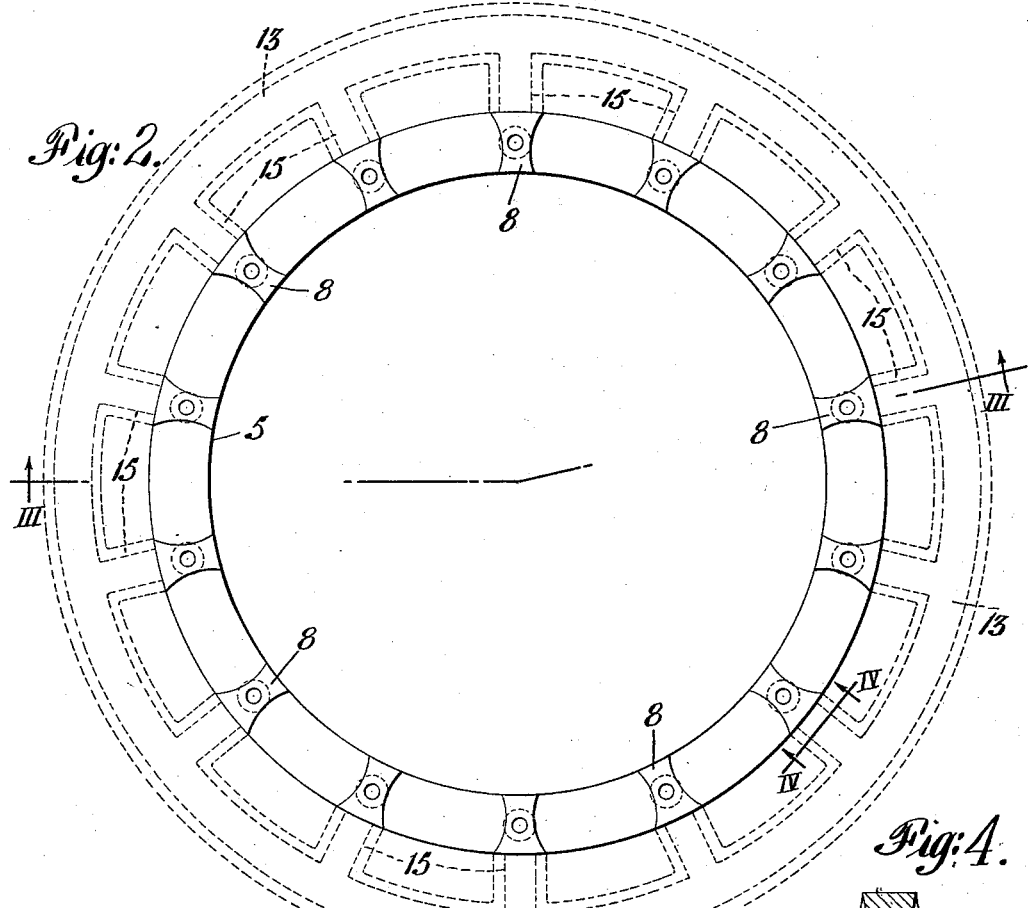
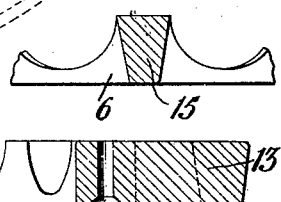
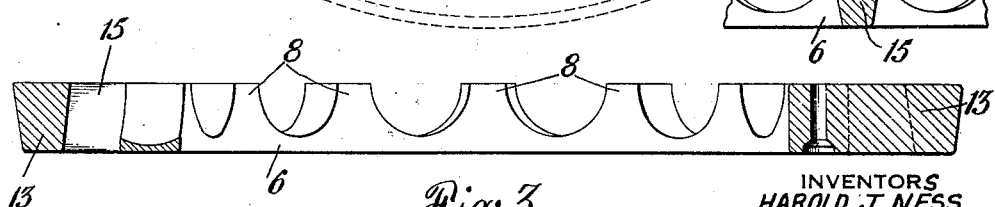
INVENTORS
HAROLD J. NESS
CLARENCE H. ROTH
By Maurice B. Landers Dec. 15, 1931.   H. J. NESS ET AL   1,836,273
METHOD OF MAKING BALL BEARING CAGES
Filed Dec. 11, 1928   3 Sheets-Sheet 3

INVENTOR
HAROLD J. NESS
BY CLARENCE H. ROTH
ATTORNEY

Patented Dec. 15, 1931

1,836,273

UNITED STATES PATENT OFFICE

HAROLD J. NESS AND CLARENCE H. ROTH, OF JERSEY CITY, NEW JERSEY, ASSIGNORS, BY MESNE ASSIGNMENTS, TO THE NEW DEPARTURE MANUFACTURING COMPANY, OF BRISTOL, CONNECTICUT, A CORPORATION OF CONNECTICUT

METHOD OF MAKING BALL BEARING CAGES

Application filed December 11, 1928. Serial No. 325,274.

The present invention relates to bearing cages and has for an object to provide a method by which ball bearing cages of improved quality can be manufactured expeditiously and economically.

Bearing cages have in general been produced by methods necessitating a number of operations usually of a character requiring particularly skilled operatives in order that the desired accuracy and quality of the product might be obtained. The present invention provides a method by which a ball bearing cage can be made of two similar cast parts secured together by a simple operation and involving relatively little machine work.

The nature and objects of the invention will be better understood from a description of a particular illustrative embodiment thereof for the purpose of which description reference should be had to the accompanying drawings forming a part hereof and in which—

Figure 5:
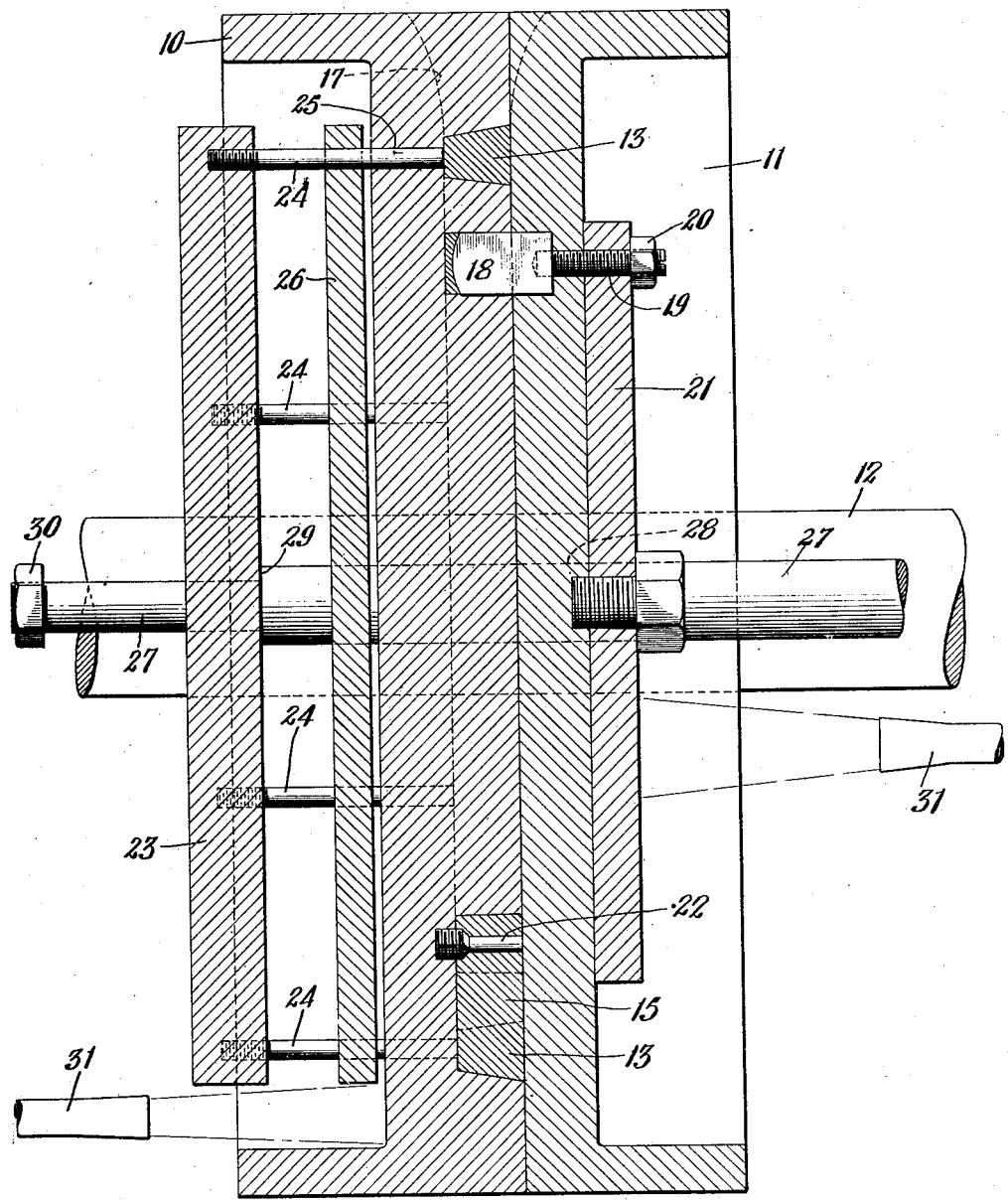
Figure 6:
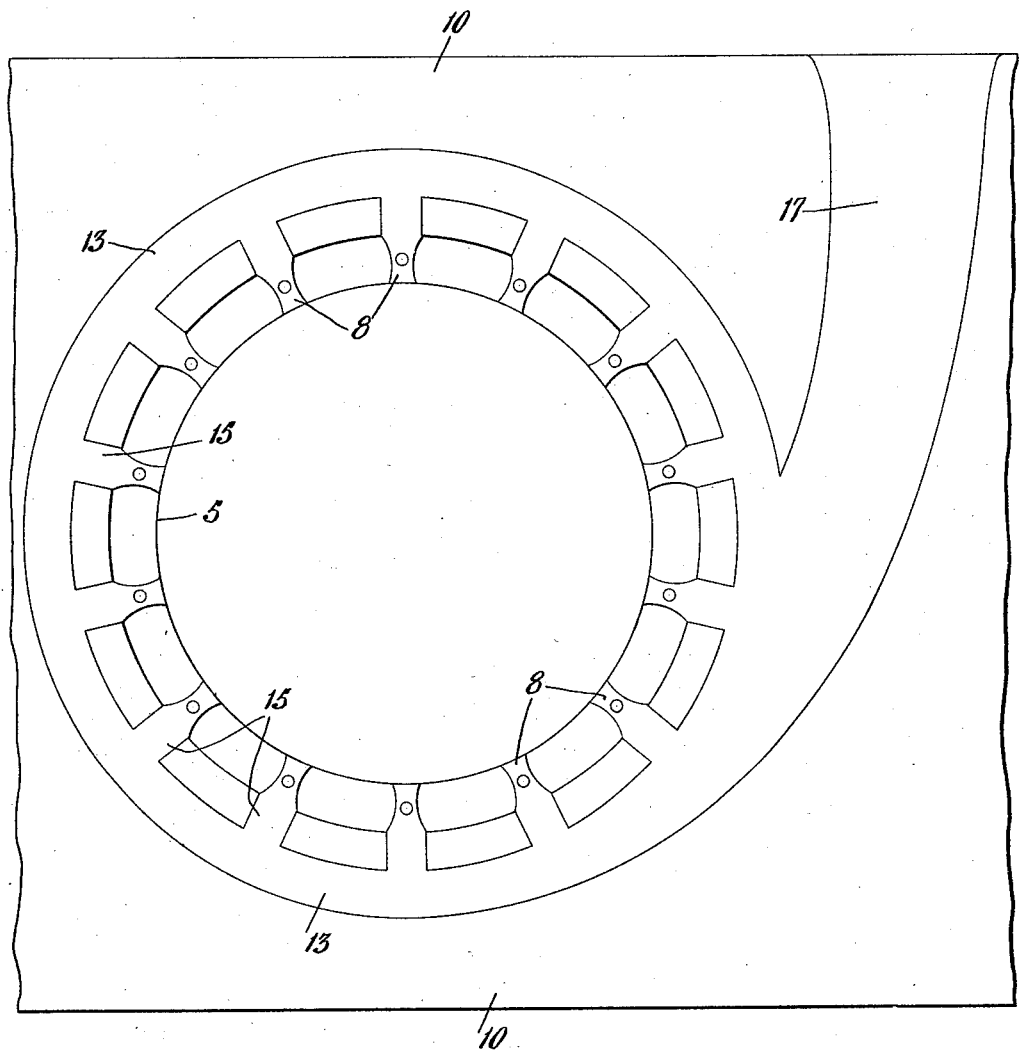

Figure 1 is a sectional view of an assembled bearing cage, cast by the process of the invention, Figure 2 is an inside face view of one of the two similar members thereof, Figure 3 is a sectional view taken on the line III—III of Fig. 2, Figure 4 is a detail sectional view taken on the line IV—IV of Fig. 2, Figure 5 is a sectional view of the mold indicating the method of casting the bearing cage members, and Figure 6 is a view showing the inner face of the female member of the die.

Referring to the drawings, in Fig. 1 is shown a complete bearing cage for a ball bearing made up of two similar cast annular members 5 and 6 riveted together as at 7. Each annular member comprises inwardly projecting ball separating walls 8 which cooperate in the assembled cage to form substantially spherical pockets to receive the balls 9, as shown in dotted lines in Fig. 1.

The method by which the annular members are cast will be best understood from a consideration of Fig. 5 in which is shown a suitable die or mold for use in casting the same. As shown the die consists of a female member 10 and a male member 11 both supported on and held in alinement by shafts 12 on opposite sides of the die. The die cavities are shaped to cast the annular bearing member together with an annular gate 13 connected to the ball separating walls 8 by extensions 15 leading from the annular gate to said separating wall sections. A suitable pouring inlet 17 is formed at the top of the die and leads into the annular gate. The gate of the form shown insures effective flow of the metal to all parts of the die to form a cage without blow-holes or defects. The form of the combined gate and annular member as cast is shown in Fig. 2, the bearing member being shown in full lines and the gate in dotted lines. In Fig. 3 the combined gate and bearing member is shown in section in full lines.

The substantially semi-spherical ball receiving recesses are formed by members 18 which are secured in the male die member 11 by stud bolts 19 and nuts 20. These stud bolts extend through the body of the die member 11 and through a backing plate 21 secured thereto.

The female member carries also pins 22 which serve to form rivet holes in the finished bearing members whereby the same are riveted together to form the complete bearing cage.

The female die member carries an ejecting mechanism adapted to facilitate removal of the bearing cage. As shown this mechanism comprises a plate 23 with a number of spaced ejecting pins 24 secured therein and operating through holes 25 in the female die member. The pins fit tightly in the plate 26, and are stiffened thereby. The operation of the ejector mechanism is controlled by bolts or shafts 27 on opposite sides of the die and passing through the male die member. Each bolt 27 extends through a hole in the plate 23, through the female die member and also through the male die member to actuating mechanism not shown. Each bolt is formed with a shoulder 29 which engages against the plate 23 when the die is in closed relation to limit the inward movement of the ejector pins 24. As the die parts are separated and the bolts 27 are drawn forward, the plate 23 will engage nuts 30 on the free ends of the bolts 27 and further separating movement of the parts will cause a relative movement of the ejector mechanism through the female die member to eject the cast annular member.

The annular gate 13 peripherally surrounds the annular mold cavity for the full width thereof. The extensions or gates 15 are of the same width and extend radially inwards to the spaces between the members 18 which are inserted in the mold cavity to form pockets for the rolling elements of the bearing. The metal thus flows radially in a wide stream directly to the mold cavity at a plurality of points to form the apertured walls 8. The metal is also introduced from the radial gates directly to the junctions between the side wall of the resulting annular member 5 and its laterally projecting walls or spacing members 8, a portion of the metal flowing circumferentially in the mold cavity from each of the radial gates at points beyond the ends of the inserted members 18. A copious flow is thus insured at these important junction points with no distant flow in restricted spaces.

The die may be heated as by gas burners conventionally indicated at 31. In operation the die is maintained at a temperature of approximately 800° Fahr. and the molten aluminum is poured at a temperature of approximately 1400° Fahr. The metal should have a composition substantially as follows:

|  | Per cent |
|---|---|
| Aluminum | 93 |
| Silicon | 5 |
| Copper | 2 |

After casting, the gate is removed from the cage section by turning in a lathe. Two similar sections are then riveted together to form a complete bearing cage.

By following the procedure indicated an effective bearing cage is produced by a method which can be operated expeditiously and economically.

The foregoing description is illustrative merely and is not intended as defining the limits of the invention.

We claim:

1. The method of making cast aluminum ball bearing cages which comprises casting by the gravity method in a metal mold heated to a temperature of approximately 800° Fahr. similar blanks each consisting of an annular member with separating wall sections projecting from one face thereof and having substantially semi-spherical ball receiving recesses between said wall sections together with an annular gate extending parallel to the annular member and having portions connecting with the separating wall sections, substantially as described.

2. The method of making bearing cages and the like, which consists in locating pocket forming inserts in an annular mold cavity, flowing molten metal in a mass to an annular gate peripherally surrounding the mold cavity for the full width thereof, flowing the molten metal inwardly through a series of radial gates to the spaces between said inserts to form a series of spacing members projecting from an annular side wall; substantially as described.

3. The method of making bearing cages and the like, which consists in locating pocket forming inserts in an annular mold cavity, flowing molten metal in a mass to an annular gate peripherally surrounding the mold cavity, flowing the molten metal inwardly through a series of radial gates to spaces between said inserts and to spaces at the ends of the inserts whereby the radial gates supply molten metal directly to the junctions between an annular side wall and a series of laterally projecting spacing members; substantially as described.

4. The method of making bearing cages and the like, which consists in flowing molten metal in a mass to an annular gate peripherally surrounding an annular mold cavity for the full width thereof, flowing the molten metal inwardly through a series of radial gates to the mold cavity to form a series of spacing members, and flowing a portion of such metal circumferentially from the inner ends of the radial gates to form an annular side wall connecting the spacing members; substantially as described.

In testimony whereof, we have signed our names to this specification this fifth day of December, 1928.

HAROLD J. NESS.
CLARENCE H. ROTH.